Dec. 30, 1952 W. ZELLER 2,623,563
CUTTING DEVICE FOR CHOPPING UP FOODSTUFF
Filed March 4, 1950
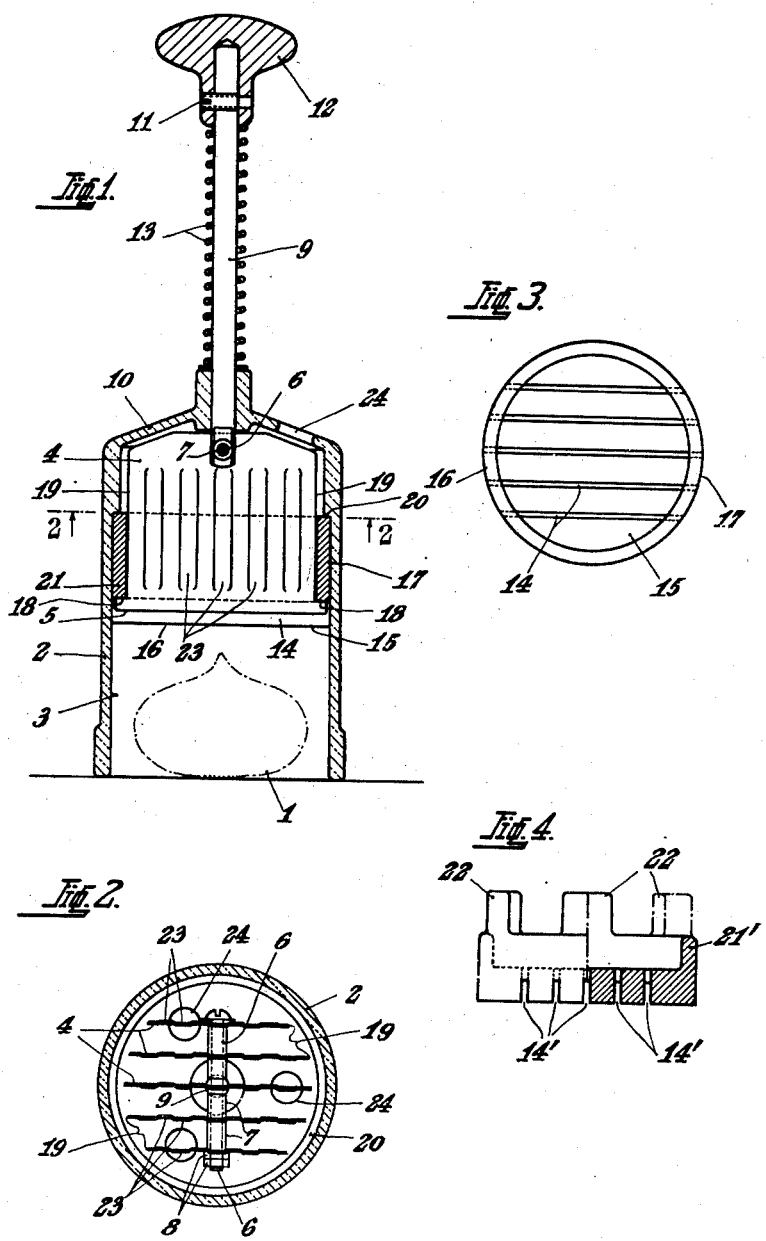
INVENTOR.
WILHELM ZELLER Patented Dec. 30, 1952

2,623,563

UNITED STATES PATENT OFFICE 2,623,563

CUTTING DEVICE FOR CHOPPING UP FOODSTUFF

Wilhelm Zeller, Ostermundigen, near Berne, Switzerland

Application March 4, 1950, Serial No. 147,681
In Switzerland March 10, 1949

3 Claims. (Cl. 146—160)

The present invention refers to a cutting device for chopping up food stuff, such as onions, garlic, carrots, parsley, cheese, bread remains and the like.

It is one of the objects of the invention to provide means affording an inexpensive and handy device of the aforesaid type, which has a bell-shaped casing adapted to be placed over the goods to be chopped up and a cylindrical inside surface and knife blades therein arranged for pivoting about the axis of the said cylindrical surface and for axial displacement thereto, said knife blades being guided in slots of a cylindrical stripper plate.

It is another of the objects of the present invention to provide means for chopping up food stuff confined within a restricted area.

It is still a further object of the present invention to provide means affording ready chopping up of food stuff restricted within a small area by longitudinally displacing a set of cutting blades adapted to be angularly displaced.

According to the invention the longitudinal ends of all the slots of the stripper plate extend at least partly up to the sliding surface of said stripper plate guided along the cylindrical inside surface of the bell-shaped casing, and the knife blades have a shoulder at each of their side edges, said shoulders being intended for the support of the stripper plate and adapted in such a manner that said knife blades do not extend beyond said stripper plate out of said slots when said stripper plate rests on said shoulders and that they extend approximately over the whole length of the slots up to the sliding surface of said stripper plate.

By way of example an embodiment of the present invention is illustrated in the drawing annexed hereto and forming part of the ensuing specification, in which:

Fig. 1 shows the cutting device in vertical section,

Fig. 2 a cross-section along line 2—2 of Fig. 1,

Fig. 3 a plan view of the stripper plate, and

Fig. 4 a side view and vertical section, respectively, of another embodiment of the stripper plate.

The cutting device illustrated comprises a bell-shaped casing 2 adapted to be placed over the goods 1 to be chopped up, said casing consisting of a transparent material such as plastics and having a cylindrical inside surface 3. In the casing 2 several knife blades 4 pierced by a screw bolt 6 at their upper edges opposite to their cutting edges 5 are provided, said screw bolt being disposed transversely to the longitudinal axis of said casing and securing said knife blades parallel to each other in equally spaced relationship by means of distance sleeves 7 fitted over to said screw bolt 6 and retained thereon by the nuts 8 screwed on to the ends of said bolt, the whole assembly permits the replacement of said knife blades which are pivotally secured on said screw bolt. An operating rod 9 engages the longitudinal center of said screw bolt 6, said operating rod 9 extends upwardly through the top face 10 of the casing 2 and carries at its upper end a knob 12 secured by means of a screw 11. The knife blades 4 are mounted for pivotal movement about the axis of the cylinder and for axial displacement by means of the rod 9, and a compression coil spring 13 disposed between the knob 12 and the top face 10 of the casing on the rod 9 keeps the knife blades 4 in raised and inoperative position.

The knife blades 4 are guided in slots 14 in the bottom 15 of a stripper plate 16 of U-shape in the vertical section, said stripper plate 16 being in turn displaceably and rotatably guided by a cylindrical gliding surface 17 along the cylindrical inside surface 3 of said casing. The slots 14 extend with their longitudinal ends up to the gliding surface 17, and the knife blades 4 have a shoulder or projection 18 at each of their side edges, said shoulders being adapted to carry the stripper plate 16 at such a distance above the cutting edges 5 of said knife blades that the latter do not project beyond the bottom side 15 on the stripper plate 16 resting on said shoulders. The knife blades 4 are guided axially at the inside surface of the stripper plate 16 by their side edges 19 above the shoulders 18, and the shoulders 18 and the knife blades 5 extend into the slots 14 with advantage only approximately up to gliding surface 17 of the stripper plate 16 so that the side edges between shoulders and cutting blades are very close to the casing side surface 3, but nevertheless cannot contact or scratch it during their up and down movement.

At the top end of the casing inside surface 3 a shoulder 20, facing the stripper plate 16, is provided in order to limit the upward motion of said stripper plate and together therewith that of the knife blades 4 and the operating rod 9. The top end of side wall 21 of stripper plate 16 abuts, in its topmost position, against the shoulder 20, or according to the alternative of the stripper plate shown in Fig. 4 side wall 21' is of smaller dimension and has three equally spaced upwardly extending projections or extensions 22, the upper ends of which are intended to abut against the shoulder 20. With this alternative the slots 14' only extend as far as the gliding surface 17 of the stripper plate in the lower part of their height whereby a good guidance for the side edges of the knife blades is achieved in the upper part of the slots.

The knife blades 4 are provided, in their central part between the securing point and the cutting edges for reinforcement in the direction of displacement, with flat ribs 23 alternately stamped out towards either side and extending in said direction. In the top face 10 three orifices 24 are provided at a certain distance from the axis of the casing for the purpose of enabling the device to be rinsed by means of water.

In use, the cutting device described is placed over the goods to be chopped up, said goods being placed on a flat surface, whereupon said goods are chopped up by depressing the operating rod 9. The stripper plate 16 comes to rest on top of the goods to be chopped up whereupon the knife blades enter said goods until their cutting edges abut said flat surface. On releasing the operating rod 9 the compression spring 13 lifts the knife blades 4 and the stripper plate 16 into their top position and stripper plate 16 comes into contact with the shoulders 20 of the casing thus stripping off any portion of said goods adhering to the knife blades 4 when said knife blades are lifted fully through the slots into the position in which the shoulders 18 of the knife blades abut against the stripper plate 16. Thereafter, the knife blades 18 are rotated about the axis of the cylinder at an angle, the size of which is of no purport, by means of the operating rod and then knife blades 18 are again depressed etc. until the goods to be chopped up have attained the desired degree of disintegration. The length of the operating rod 9 is such that the cutting edges of the knife blades 4 and the bottom 15 of the stripper plate 16 can be pushed beyond the edge of the bell-shaped opening of the casing 2 so that after use particles of the goods chopped up which adheres to the bottom side of the stripper plate can, without trouble, be wiped off. The knife blades are displaced with sufficient friction in the slots 14 and 14' respectively in order that the stripper plate 16 moves together with the knife blades except when movement of the former is limited by the goods to be chopped up.

The component parts of the cutting device are made from rustproof material which can be rinsed after use and put aside to dry without wiping.

What I claim and wish to secure by Letters Patent is:

1. A cutting device for chopping food, comprising in combination, a casing adapted to be placed over the food to be chopped, said casing having a cylindrical inner surface provided with a shoulder in the upper part thereof; a plurality of substantially parallel blades arranged in the upper portion of said casing; means for moving said blades as a unit within said casing downwards and upwards so that said blades chop the food over which said casing is placed; a cylindrical stripper plate having slots for said blades, said stripper plate having a diameter substantially equal to the diameter of said cylindrical surface of said casing, said stripper plate having a first end face adapted for engagement with the shoulder of said cylindrical surface of said casing; and projections forming part of said blades and being arranged near the cutting edges thereof, said projections protruding over the other end face of said stripper plate so as to hold the same, whereby the upward movement of said blades is stopped when said first end face of said stripper plate engages the shoulder in said cylindrical surface of said cylinder.

2. A device as claimed in claim 1, including a plurality of extensions arranged on said stripper plate at one side thereof so as to form the first end face of said stripper plate, said extensions abutting against the shoulder of said cylindrical surface of said casing when said stripper plate is in the uppermost position thereof.

3. A device as claimed in claim 2, said extension being equally spaced along the perimeter of said stripper plate.

WILHELM ZELLER.

REFERENCES CITED

The following references are of record in the file of this patent:

UNITED STATES PATENTS

| Number | Name | Date |
|---|---|---|
| 210,503 | Coulter | Dec. 3, 1878 |
| 461,821 | Edwards | Oct. 27, 1891 |
| 2,437,637 | Bridge | Mar. 9, 1948 |

FOREIGN PATENTS

| Number | Country | Date |
|---|---|---|
| 612,316 | France | July 27, 1926 |
| 260,778 | Switzerland | Aug. 1, 1949 |
| 631,189 | Great Britain | Oct. 28, 1949 |